United States Patent
Yoshizawa et al.

(10) Patent No.: US 7,408,956 B2
(45) Date of Patent: Aug. 5, 2008

(54) COMMUNICATION APPARATUS AND COMMUNICATION METHOD

(75) Inventors: Kensuke Yoshizawa, Osaka (JP); Shinichiro Ohmi, Osaka (JP)

(73) Assignee: Matsushita Electric Industrial Co., Ltd., Osaka (JP)

( * ) Notice: Subject to any disclaimer, the term of this patent is extended or adjusted under 35 U.S.C. 154(b) by 616 days.

(21) Appl. No.: 11/187,933

(22) Filed: Jul. 25, 2005

(65) Prior Publication Data
US 2006/0023749 A1 Feb. 2, 2006

(30) Foreign Application Priority Data
Jul. 27, 2004 (JP) ............... 2004-219117

(51) Int. Cl.
*H04J 3/16* (2006.01)
*H04L 12/28* (2006.01)
(52) U.S. Cl. ............ 370/470; 370/252; 370/392; 370/395.4
(58) Field of Classification Search ........... 370/252, 370/335, 342, 392, 393, 390, 401, 445, 470, 370/447, 395.4
See application file for complete search history.

(56) References Cited
U.S. PATENT DOCUMENTS
6,987,770 B1 * 1/2006 Yonge, III ............ 370/401

2004/0136344 A1 * 7/2004 Kim et al. ............ 370/335

FOREIGN PATENT DOCUMENTS
JP 7-123118 5/1995
JP 2003-69642 3/2003

OTHER PUBLICATIONS
"Information technology- Telecommunications and information exchange between systems- Local and metropolitan area networks- Specific requirements-", Part 11: Wireless LAN Medium Access Control (MAC) and Physical Layer (PHY) Specifications, ANSI/IEEE Std 802.11, 1999 Edition (R2003) pp. 34-42.

* cited by examiner

*Primary Examiner*—Afsar M. Qureshi
(74) *Attorney, Agent, or Firm*—Wenderoth, Lind & Ponack, LLP

(57) ABSTRACT

A data communication frame is formed by a preamble portion (PREAMBLE) for demodulation and synchronization, a frame information portion (FC) containing a data type of the frame, a frame length portion (FL), and a data body portion (DATABODY) composed of more than one data packet combined together. If a request to transmit a packet is made from an upper layer, a communication apparatus 10 concurrently performs a process of calculating a frame length the frame would have if combining of the packet is performed and a process of transmitting the preamble portion and the frame information portion. The frame length depends on packets, while the preamble portion and the frame information portion do not depend on packets.

7 Claims, 10 Drawing Sheets

COMMUNICATION APPARATUS AND COMMUNICATION METHOD

BACKGROUND OF THE INVENTION

1. Field of the Invention

The present invention relates to a communication apparatus and a communication method, and, more particularly, to a communication apparatus and a communication method which employ a data communication frame formed by combining a plurality of packets.

2. Description of the Background Art

In general, when incorporating packets (e.g., IP packets) provided from an upper layer or packets (e.g., ethernet frames) provided from another protocol inside a bridge into a frame in the Medium Access Control (MAC) layer of a data communication system, a header containing control information, such as a destination address, a source address, a frame type, etc., is always assigned to the head of each packet. From the viewpoint of the upper layer, however, this header information is overhead, and may be a factor for decreasing packet transmission efficiency.

Methods for reducing overhead to reduce the decrease in the packet transmission efficiency are proposed in Japanese Laid-Open Patent Publication No. 7-123118 and Japanese Laid-Open Patent Publication No. 2003-69642. In these methods, as illustrated in FIG. 13, headers (H1 to H4) specific to respective packets (P1 to P4) are not provided, but instead, a plurality of packets are combined together and then a single header (H) is assigned to a group of packets (i.e., a frame) thus obtained.

When the above-described methods of combining a plurality of packets for transmission are applied to a communication system which employs, as a medium, an air (wireless), a power line, or the like, the following problem arises.

In communication systems which employ, as a medium, an air (wireless), a power line, or the like, it is difficult to accurately grasp whether another communication apparatus is currently transmitting data, and it is impossible to determine the end of a frame. Therefore, for example, in the case where header portions are transmitted at a low rate and data portions are transmitted in a highly efficient manner by employing a modulation system (e.g., Discrete Multi Tone (DMT)) specific to communication apparatuses that communicate with each other, data collision may occur.

One conceivable method to solve this problem is to write within a header a period of time required (or the number of symbols to be transmitted) for completing the transmission of a frame containing a plurality of packets, by adopting a conventional method of adding to a header portion the information of a period of time (in microseconds) required (or the number of symbols to be transmitted) for completing the transmission of a frame and thus reporting the information to a communication apparatus on the receiving end. This conventional method is disclosed in IEEE Std 802.11, "Wireless LAN Medium Access Control (MAC) and Physical Layer (PHY) Specifications".

In order to implement this method, it is necessary to calculate the total transmission time for a frame containing combined packets (or the total number of symbols to be transmitted) before transmitting the frame. However, it is impossible to calculate in advance the total transmission time for a frame (or the total number of symbols to be transmitted) in the case of a system in which an optimal value of a modulation parameter is dynamically selected for each pair of communication apparatuses that communicate with each other in accordance with transmission path fluctuation (e.g., a system that employs DMT in multicarrier transmission, in which transmission path fluctuation is regularly examined, and each time transmission path fluctuation is examined, an optimal modulation parameter is selected), and in the case where packets to be combined together may have various data lengths.

Therefore, it is necessary to repeatedly perform, when transmitting a frame, a process of obtaining a current modulation parameter and the data length of a current packet stored in a buffer and, after adding the packet to the frame, carrying out calculation with respect to combining of packets. Therefore, as the number of packets to be combined together increases, the time required for calculating the total transmission time (or the total number of symbols to be transmitted) becomes longer. As a result, the interval between the completion of the transmission of a frame and the start of the transmission of the next frame becomes long (i.e., the interframe gap becomes large). In other words, the transmission efficiency of the communication system as a whole becomes reduced, despite the intention to improve the transmission efficiency by combining packets.

In addition, in order to avoid conflict between a plurality of communication apparatuses, an interframe gap specific to a system should be set. At this time, the value of the interframe gap specific to the system should be the period of time required for completing calculation with respect to the maximum number of packets that can be combined together, even in the case where only a small number of packets are actually to be combined together. This is an inefficient operation.

SUMMARY OF THE INVENTION

Therefore, an object of the present invention is to provide a communication apparatus and a communication method which enable efficient data transmission by allowing combining a plurality of packets together to be compatible with a small value of the interframe gap specific to a system.

The present invention is directed to a communication apparatus for performing communication by using a data communication frame formed from a plurality of portions, the portions being arranged in the order of a preamble portion for demodulation and synchronization, a frame information portion containing a data type of the frame, a frame length portion for indicating a length of the frame, and a data body portion composed of more than one data packet combined together. To achieve the object above, the communication apparatus according to the present invention comprises a frame length calculation section, a communication control section, and a frame generation section.

Each time a request to transmit a data packet is made from an upper layer, the frame length calculation section calculates a frame length the frame would have if combining of the data packet is performed. The communication control section determines the number of data packets that are to be combined together in the frame, based on a calculation by the frame length calculation section. The frame generation section generates and transmits the preamble portion and the frame information portion concurrently with calculation by the frame length calculation section, and, after the calculation by the frame length calculation section is completed, generates and transmits the frame length portion and the data body portion composed of the number of data packets combined together, the number having been determined by the communication control section.

Preferably, the frame generation section sets a length of the preamble portion so that the calculation by the frame length calculation section is completed before transmission of the preamble portion and the frame information portion is completed. Alternatively, the communication control section may set the number of data packets to be combined together in the frame so that the calculation by the frame length calculation section is completed before transmission of the preamble portion and the frame information portion is completed. Typically, the frame length is measured in the number of symbols or the length of time. Also, it may be so arranged that the frame information portion and the frame length portion have been subjected to modulation having a high error tolerance or an error correcting coding.

A series of processes performed by the communication apparatus as described above can be considered as a communication method. This communication method may be provided in the form of a program that is capable of causing a computer to perform the series of processes. This program may be recorded on a computer-readable recording medium and then the program recorded on the medium may be introduced to the computer. In addition, functional blocks that form a part of the above-described communication apparatus may be realized as an LSI, which is an integrated circuit.

According to the present invention, a process of transmitting the preamble portion and the frame information portion, which do not depend on packets, is performed concurrently with a process of calculating the length of a frame composed of a plurality of packets combined together. Thus, improvement in transmission efficiency is achieved by combining packets while the value of an interframe gap is set low. Further, a communication apparatus on the receiving end is capable of easily determining, from information in the frame length portion, a time period required for completing reception of one frame composed of a plurality of packets combined together. Therefore, it is made possible to avoid conflict with another communication apparatus by grasping usage status of media in communication apparatuses that are currently communicating with each other.

These and other objects, features, aspects and advantages of the present invention will become more apparent from the following detailed description of the present invention when taken in conjunction with the accompanying drawings.

DESCRIPTION OF THE PREFERRED EMBODIMENTS

Hereinafter, an embodiment of the present invention will be described with reference to the accompanying drawings.

Figure 1:
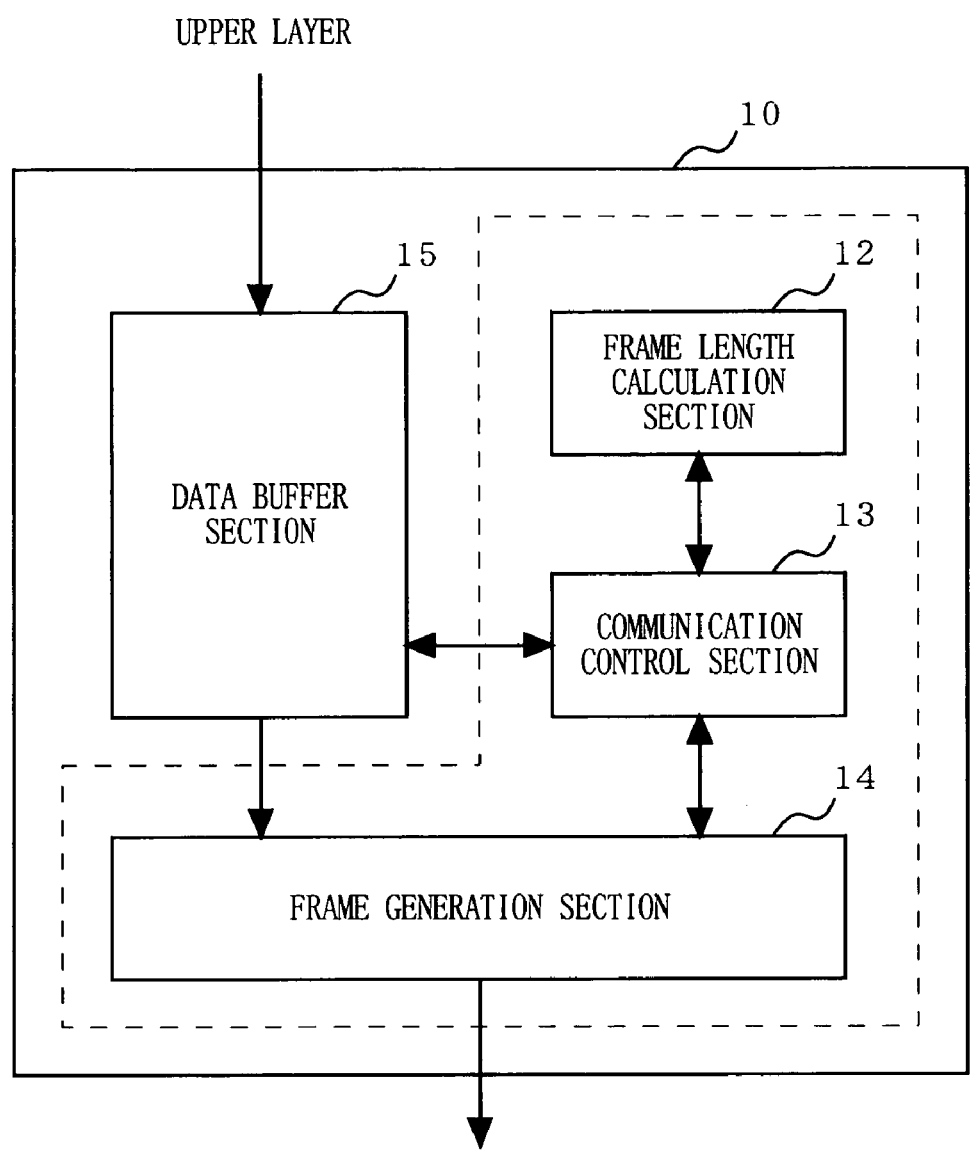
FIG. 1 is a block diagram illustrating a structure of a communication apparatus 10 according to an embodiment of the present invention.

FIG. 1 is a block diagram illustrating a structure of a communication apparatus 10 according to an embodiment of the present invention. In FIG. 1, the communication apparatus 10 according to the present invention includes a frame length calculation section 12, a communication control section 13, a frame generation section 14, and a data buffer section 15.

The data buffer section 15 stores a packet the transmission of which has been requested from an upper layer (not shown) according to a data structure described later. Once a packet is stored in the data buffer section 15, the communication control section 13 acquires information of the packet and passes the information to the frame length calculation section 12 together with other information such as a transmission rate, etc. The communication control section 13 also determines whether packet-combining is possible based on a calculation result received from the frame length calculation section 12. According to the information passed from the communication control section 13, the frame length calculation section 12 calculates transmission time required for transmitting the packet (or the number of symbols to be transmitted). According to an instruction from the communication control section 13, the frame generation section 14 performs combining of packets stored in the data buffer section 15 and the transmission of a data communication frame obtained by combining the packets.

Figure 2:
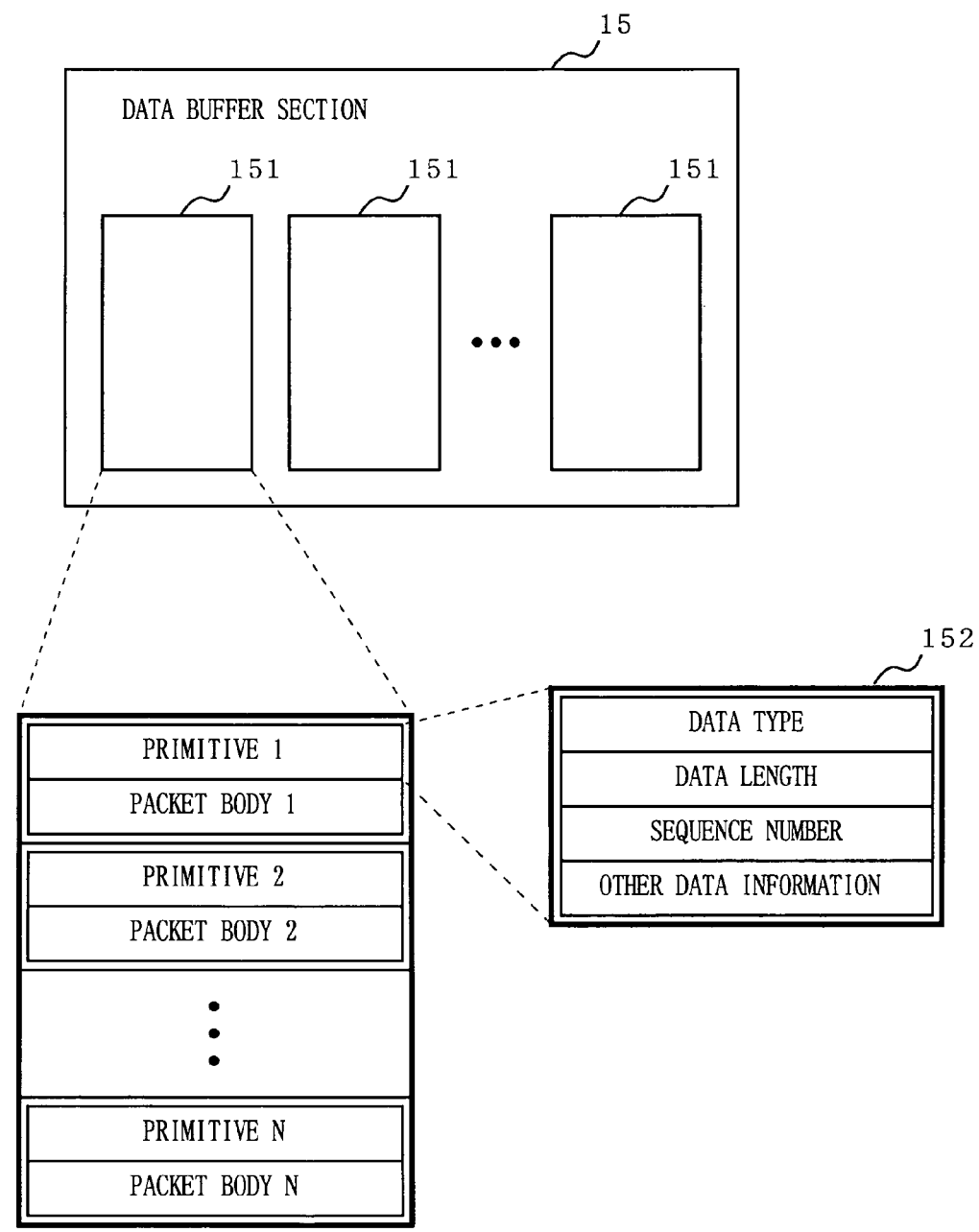
FIG. 2 is a diagram illustrating an exemplary data structure in a data buffer section 15.

FIG. 2 is a diagram illustrating an exemplary data structure in the data buffer section 15. In FIG. 2, the data buffer section 15 is provided with dedicated packet storage blocks 151 which are prepared with respect to each destination of packets or each packet type. In each packet storage block 151, a packet the transmission of which has been requested from the upper layer is stored, such that a primitive and a packet body thereof are stored separately. A primitive 152 contains the data type of a packet (e.g., an identifier for identifying whether the packet is a control packet or a data packet), the data length (the number of bytes) of the packet, a sequence number, and other data information. The packet body is data itself.

Figure 3:
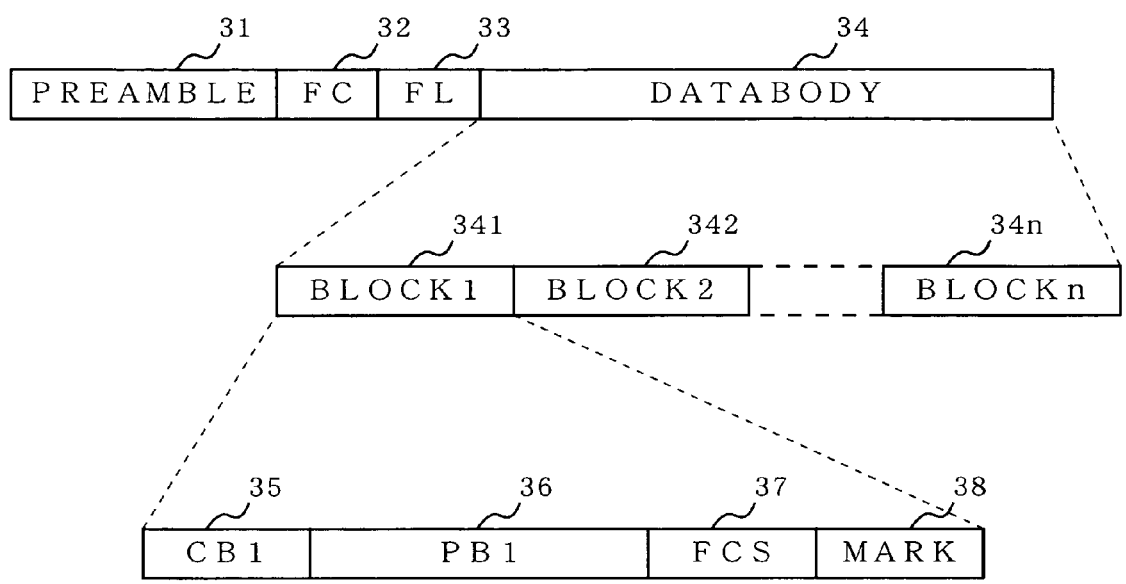
FIG. 3 is a diagram illustrating an exemplary structure of a data communication frame which is generated in a frame generation section 14.

FIG. 3 is a diagram illustrating an exemplary structure of a data communication frame generated by the frame generation section 14. In FIG. 3, a frame is formed by a preamble portion (PREAMBLE) 31, a frame information portion (FC) 32, a frame length portion (FL) 33, and a data body portion (DATABODY) 34, which are arranged in this order. The data body portion 34 is formed by combining a first to nth block portions 341 to 34n, where the variable n is a natural number, and does not need to be a value specific to a system but may be flexibly varied in accordance with a prescribed frame transmission time or a frame type. Each of the first to nth block portions 341 to 34n is formed by a block control information portion (CB) 35, a packet body portion (PB) 36, an error detection portion (FCS) 37, and a synchronization word portion (MARK) 38.

In the preamble portion 31, a data sequence having a fixed pattern is stored which is used for synchronization and demodulation (e.g., carrier detection, clock recovery, etc.) performed by a communication apparatus on the receiving end. In the frame information portion 32, control information, such as a source address, a destination address, a network ID, a data type, etc., is stored. The frame information portion 32 has been subjected to low-rate modulation which allows the frame to be received by all communication apparatuses and error correcting coding that has a high error correction capability. The values of the preamble portion 31 and the frame information portion 32 are fixed values which do not depend on the packets provided from the upper layer. In the frame length portion 33, the transmission time required for transmitting the whole blocks which are combined together (or the number of symbols to be transmitted) is stored. The transmission time (or the number of symbols to be transmitted) is calculated by a frame length calculation process described later. The frame length portion 33 also has been subjected to low-rate modulation which allows the frame to be received by all communication apparatuses and error correcting coding that has a high error correction capability. It is to be appreciated that the methods of modulation and error correcting coding applied to the frame information portion 32 and the frame length portion 33 need not be the same between the frame information portion 32 and the frame length portion 33. The values of the frame length portion 33 and the data body portion 34 are variable values which depend on the packets provided from the upper layer. Therefore, the values should be calculated before transmission.

The block control information portion 35 stores: a sequence number used for detecting a packet loss or duplication; a block number, which is the number of the block being combined; the data length (the number of bytes) of the packet; a life time for taking account of a prescription of packet delay time; control information related to the packet body portion 36; an error-detecting code (e.g., a Cyclic Redundancy Check (CRC)) for detecting an error in the block control information portion 35; and so on. In the packet body portion 36, a data packet the transmission of which has been requested from the upper layer is stored. For example, an ethernet frame may be stored in the packet body portion 36. The error detection portion 37 detects an error in the packet body portion 36, and is, for example, a 32-bit CRC or the like. The synchronization word portion 38 indicates completion of the transmission of the block, and is, for example, an identifier composed of fixed 16 bytes, in which 0x00data is 12 bytes and 0xAA data is 4 bytes.

Figure 4:
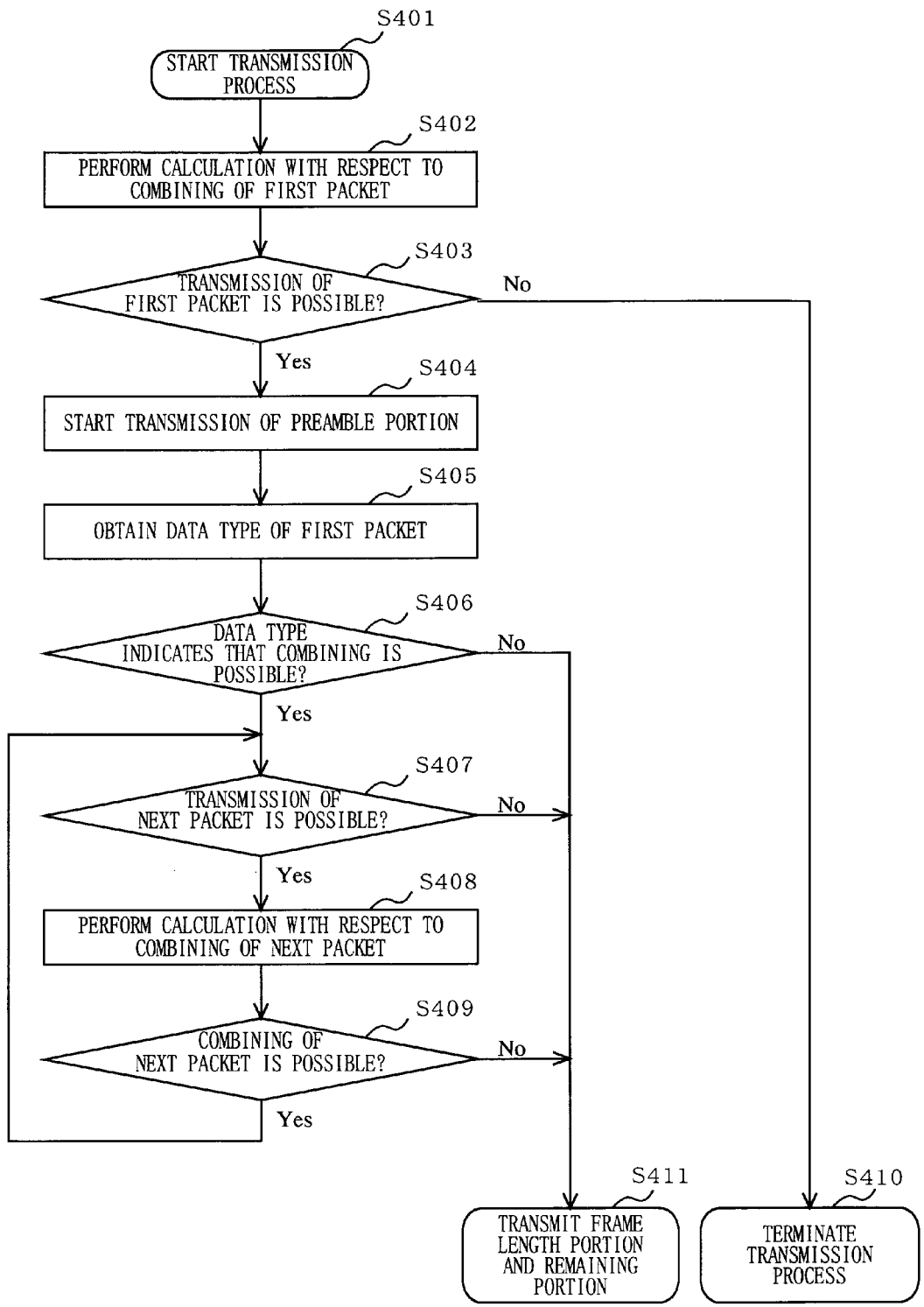
FIG. 4 is a flowchart illustrating a processing procedure of a communication method according to an embodiment of the present invention.

Next, further referring to FIG. 4, a process performed by the communication apparatus 10 according to an embodiment of the present invention will be described. FIG. 4 is a flowchart illustrating a processing procedure of a communication method according to an embodiment of the present invention.

A communication process of the present invention starts once the communication control section 13 detects that a first packet that is to be subjected to a transmission process has been stored in the data buffer section 15 (step S401). Once the communication process starts, the communication control section 13 acquires the data length of the first packet from the primitive 152 of the data buffer section 15, and issues to the frame length calculation section 12 a calculation request together with information of the data length, a transmission rate, and the like.

Upon receiving the calculation request, the frame length calculation section 12 calculates the total number of bytes of the data body portion 34, while taking account of the data length of the first packet and overhead such as the block control information portion 35, the error detection portion 37, the synchronization word portion 38, etc. Next, the frame length calculation section 12 calculates the transmission time (or the number of symbols to be transmitted) for the first block portion 341 based on the calculated total number of bytes and the transmission rate. Further, the frame length calculation section 12 adds, to the calculated transmission time (or the number of symbols to be transmitted) for the first block portion 341, the transmission time (or the number of symbols to be transmitted) for the preamble portion 31, the frame information portion 32, and the frame length portion 33, thereby deriving the total transmission time required (or the total number of symbols to be transmitted) for completing the transmission of the frame (step S402). Then, the frame length calculation section 12 reports to the communication control section 13 the total transmission time (or the total number of symbols to be transmitted) thus obtained.

Based on the total transmission time (or the total number of symbols to be transmitted) reported from the frame length calculation section 12, the communication control section 13 determines whether the transmission of this frame, i.e., the first packet, is possible (step S403). Specifically, the transmission of the frame is determined to be possible if the total transmission time (or the total number of symbols to be transmitted) does not exceed a transmission time (or the number of transmitted symbols) allowed for one frame, whereas the transmission of the frame is determined to be impossible if the total transmission time (or the total number of symbols to be transmitted) exceeds the transmission time (or the number of transmitted symbols) allowed for one frame. The term "total transmission time allowed for one frame" used herein is defined in the following manner.

Figure 5:
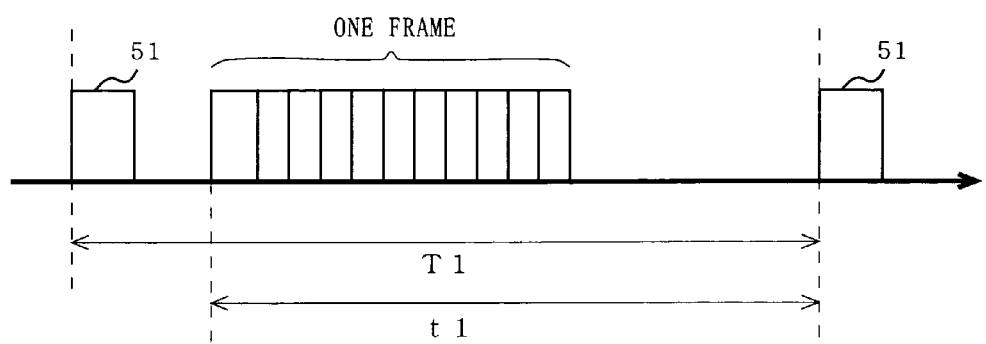
FIG. 5 and FIG. 6 are diagrams for explaining transmission time allowed for one frame.
Figure 6:
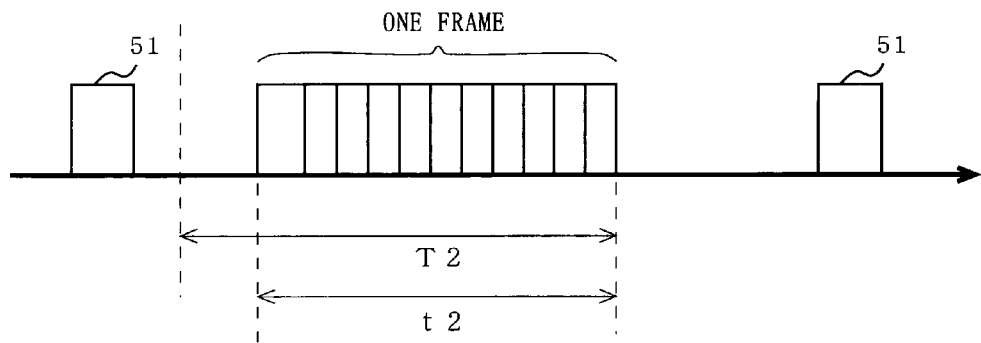

In the case of a communication system in which beacons 51 are transmitted in a fixed cycle T1, "total transmission time allowed for one frame" means a period of time t1 between a current time and the start of the transmission of the next beacon (see FIG. 5). In the case of a communication system in which time division is applied and an assigned band is T2, "total transmission time allowed for one frame" means a period of time t2 between a current time and a time at which the assigned band ends (see FIG. 6).

If the communication control section 13 determines in step S403 that the transmission of the frame is impossible, the communication control section 13 terminates this process (step S410). If communication control section 13 determines in step S403 that the transmission of the frame is possible, the communication control section 13 issues to the frame generation section 14 a request to transmit the preamble portion 31. Upon receiving this request, the frame generation section 14 generates the preamble portion 31 and starts transmitting the preamble portion 31 (step S404). Further, the communication control section 13 obtains the data type of the first packet from the primitive 152 of the data buffer section 15 (step S405), determines from this data type whether the first packet is a kind of packet that is capable of being combined (step S406). Specifically, a data packet is determined to be capable of being combined, and a control packet is determined to be incapable of being combined.

In addition, this data type is reported to the frame generation section 14 and used to determine the length of the preamble portion 31 that is to be generated. For example, if the data type indicates that the first packet is a kind of packet that is capable of being combined, it is determined that the preamble portion 31 should be composed of 15 symbols, whereas if the data type indicates that the first packet is a kind of packet that is incapable of being combined, it is determined that the preamble portion 31 should be composed of 10 symbols. Also, in the case where there is a desire to vary the maximum number of blocks that can be combined together, if the data type indicates that the maximum number of blocks that can be combined together is set low, it may be determined that the preamble portion 31 should be composed of 12 symbols, whereas if the data type indicates that the maximum number of blocks that can be combined together is set high, it may be determined that the preamble portion 31 should be composed of 15 symbols.

If block-combining is determined to be impossible in step S406, the communication control section 13 forwards to the frame generation section 14 the total transmission time (or the total number of symbols to be transmitted) received from the frame length calculation section 12. The frame generation section 14 performs transmission based on a frame format as illustrated in FIG. 3 (step S411). It is to be appreciated that while these determinations are being made, the frame generation section 14 continues to transmit the preamble portion 31. On the other hand, if block-combining is determined to be possible in step S406, the communication control section 13 further determines whether combining and transmission of the next packet is possible (step S407). In step S407, it is determined whether a packet that is yet to be transmitted has been newly stored in the data buffer section 15, and in the case where such a packet is newly stored in the data buffer section 15, it is determined whether the maximum number of packets that can be combined together has been reached.

If it is determined that combining and transmission of the next packet, i.e., a second packet, is possible, the communication control section 13 obtains from the data buffer section 15 information as to the second packet, and issues to the frame length calculation section 12 a request to calculate the frame length in the same manner as with the first packet. The frame length calculation section 12 calculates the total transmission time (or the total number of symbols to be transmitted) in the case where the second packet is combined with the first packet, and returns the calculation to the communication control section 13 (step S408). Based on the calculation received from the frame length calculation section 12, the communication control section 13 determines once again whether the combining and transmission of the second packet is possible (step S409).

If it is determined in step S409 that the combining and transmission of the second packet is impossible, the communication control section 13 reports to the frame generation section 14 the transmission time (or the total number of symbols to be transmitted) in the case where only the first packet is transmitted, and requests the frame generation section 14 to transmit the frame length portion 33 and the remaining part of the frame (step S411). On the other hand, if it is determined in step S409 that the combining and transmission of the second packet is possible, the communication control section 13 repeatedly performs the above-described processes of steps S407 to S409 with respect to a new packet(s) that is yet to be transmitted, until combining and transmission of any packet is determined to be impossible.

Figure 7:
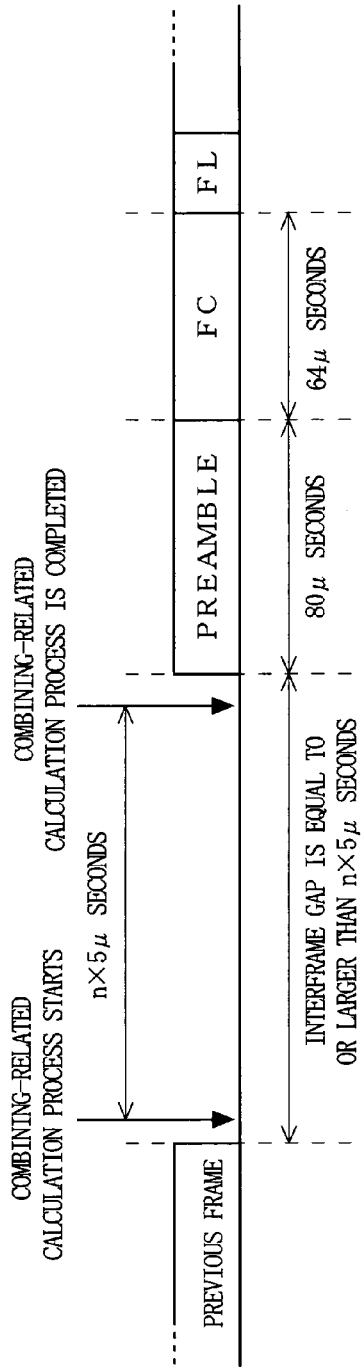
FIG. 7 is a diagram for explaining a conventional communication method.
Figure 8:
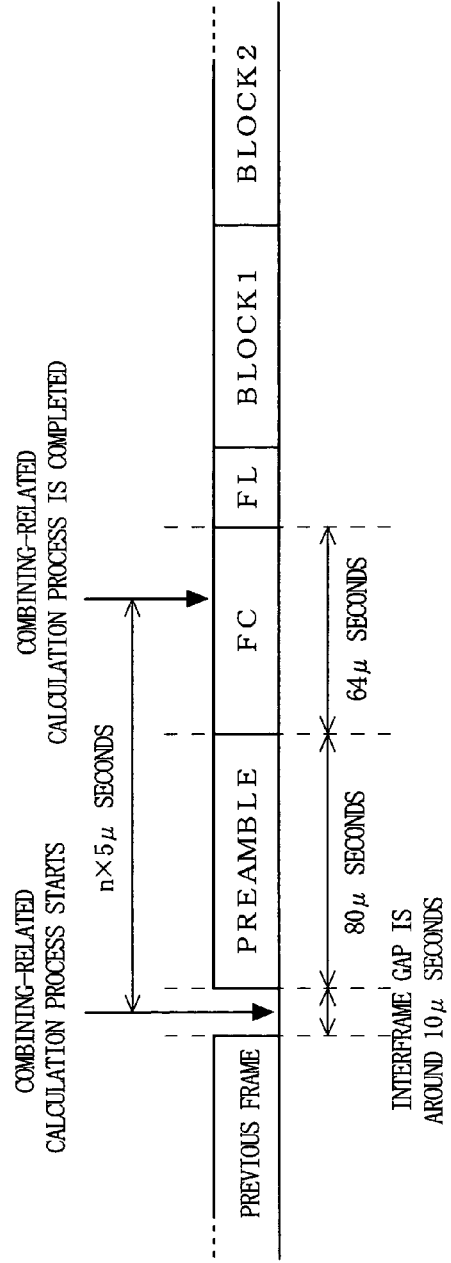
FIG. 8 to FIG. 10 are diagrams for explaining exemplary communication methods according to an embodiment of the present invention.

An effect of the above-described communication method will now be specifically described with reference to FIG. 7 and FIG. 8. FIG. 7 is a diagram for explaining a conventional communication method. FIG. 8 is a diagram for explaining an exemplary communication method according to an embodiment of the present invention. In these examples, it is assumed that time spent by a communication system to transmit one symbol is 8µ seconds, that the length of a preamble portion is 10 symbols (=80µ seconds), and that the length of the frame information portion is 8 symbols (=64µ seconds). Also, it is assumed that a time required for obtaining information as to a packet from the data buffer section 15 and performing a series of combining-related calculations with respect to the packet to calculate the frame length is 5µ seconds. Also, it is assumed that a process of transmitting a frame is started at the time when the transmission or reception of the immediately previous frame is completed. Also, it is assumed that the maximum number of packets that can be combined together is n.

In the conventional communication method illustrated in FIG. 7, the maximum time that can elapse between the start of the transmission process and the determination of the number of symbols that are to be transmitted corresponds to a time required for completing a process of calculating the frame length in the case where n packets are combined, i.e., n×5µ seconds. In conventional communication apparatuses, transmission of the preamble portion and the frame information portion starts after the process of calculating the frame length is completed; therefore, a communication system for such conventional communication apparatuses requires the interframe gap to be set equal to or larger than n×5µ seconds.

On the other hand, in the communication method according to the present invention illustrated in FIG. 8, a process of transmitting the preamble portion and the frame information portion, which do not depend on packets, is performed concurrently with a process of calculating the frame length. Therefore, the interframe gap can be set independent of the time required for completing the frame length calculation process. Specifically, a time required for performing the processes of steps S401 to S404 of FIG. 4, i.e., a time required for performing the calculation process with respect to one packet (approximately 10µ seconds), or a little longer suffices for the interframe gap. Therefore, the interframe gap can be determined in view of another factor, such as a time it takes to detect a carrier since the start of the transmission of a frame, or the like.

In the case where a large number of packets are combined together, the time required for the frame length calculation process may be equal to or longer than the time required for the transmission of the preamble portion and the frame information portion. In the example of FIG. 8 described above, the time required for the transmission of the preamble portion and the frame information portion is assumed to be 144(=80+64)µ seconds; therefore, if the number of packets to be combined together is equal to or greater than 29, the time required for the frame length calculation process is equal to or longer than 145 (=29×5)µ seconds, which means that the time required for the frame length calculation process is longer than the time required for the transmission of the preamble portion and the frame information portion. In order to cope with such a situation, the following two techniques are proposed in the communication method of the present invention.

[First Technique]

Figure 9:
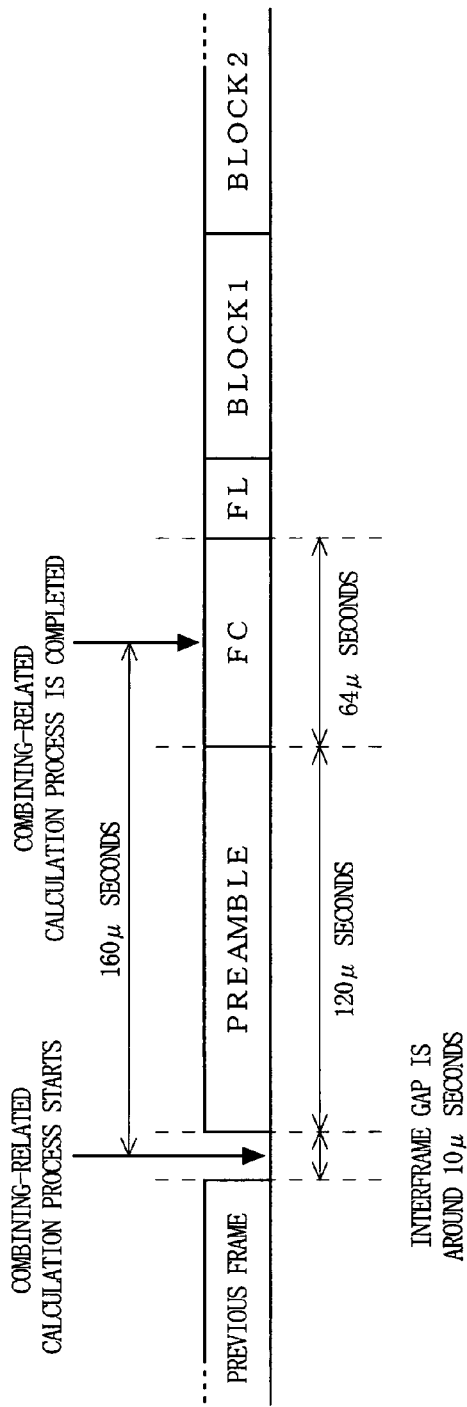

In a first technique, in order to avoid the situation where the frame length calculation process has not been completed when the transmission of the frame length portion starts, the transmission time for the preamble portion is set so long that a time period from the start of the transmission of the preamble portion to the completion of the transmission of the frame information portion becomes equal to or longer than a time period required for calculating the frame length in the case where the frame is composed of n packets (i.e., the maximum number of packets that can be combined). FIG. 9 illustrates the case where the maximum number n of packets that can be combined is set to 32 (i.e., the time period required for calculating the frame length is 160µ seconds) and the time period from the start of the transmission of the preamble portion to the completion of the transmission of the frame information portion is set to 184µ seconds (=120µ seconds (for the preamble portion) +64µ seconds (for the frame information portion)). Although the preamble portion is lengthened, the transmission efficiency with respect to one frame is improved as compared with the conventional case where the interframe gap is set large (e.g., 160μ seconds). It is to be appreciated that because the preamble portion is employed for clock recovery and carrier detection, longer preamble portions may result in improvement in precision and thus the packet error rate may be improved. Needless to say, in the case of a control packet, which does not require packet-combining, the preamble portion can be made as short as possible to improve the transmission efficiency.

[Second Technique]

Figure 10:
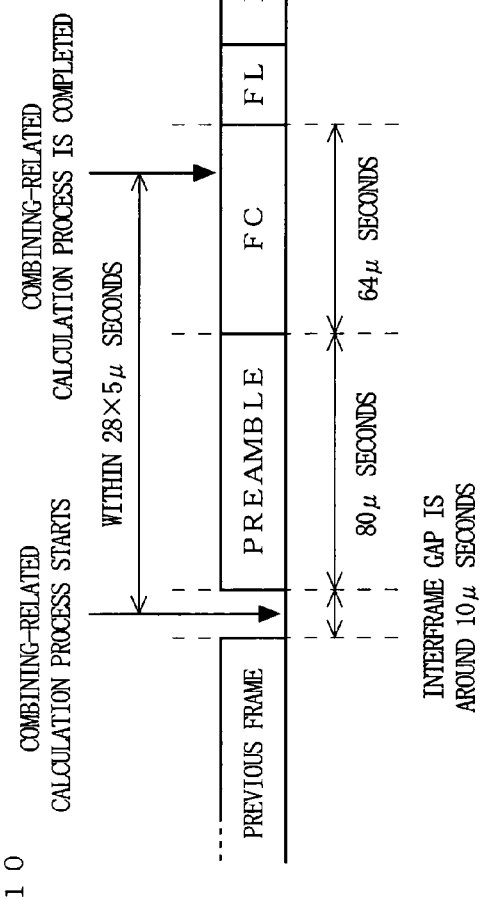

In a second technique, in order to avoid the situation where the frame length calculation process has not been completed when the transmission of the frame length portion starts, the maximum number n of packets that can be combined is limited so that the time period for the frame length calculation process required for combining packets does not exceed the time period from the start of the transmission of the preamble portion to the completion of the transmission of the frame information portion. FIG. 10 illustrates the case where the maximum number n of packets that can be combined is limited to 28 so that the frame length calculation process will be completed within 144μ seconds.

Figure 11:
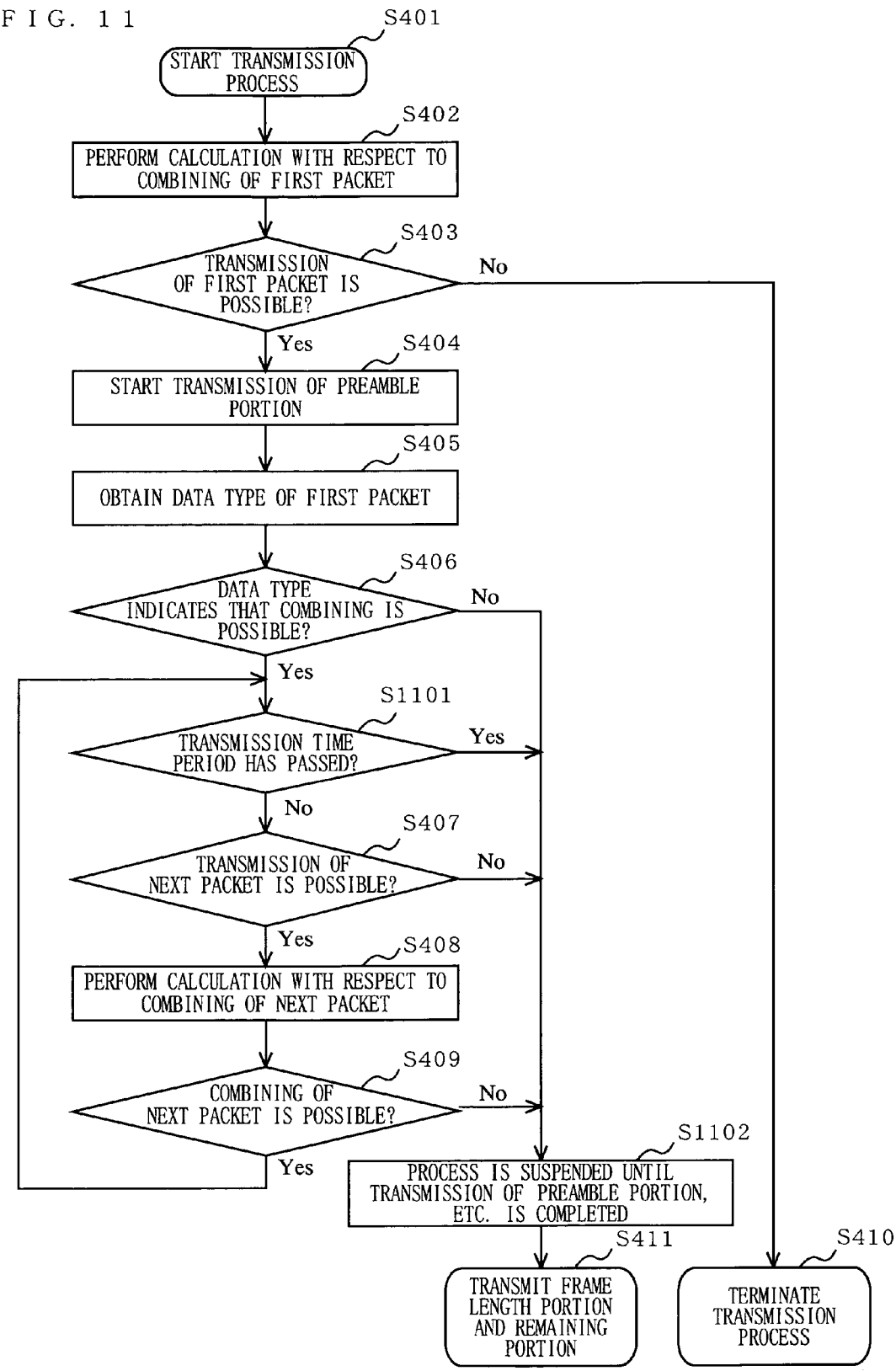
FIG. 11 is a flowchart illustrating another processing procedure of the communication method according to an embodiment of the present invention.

FIG. 11 is a flowchart illustrating a processing procedure of the communication method based on the second technique above. The flowchart of FIG. 11 is identical to the flowchart of FIG. 4 except that the following processes are added.

If it is determined in step S406 that the first packet is a kind of packet that is capable of being combined, it is determined whether a time period from the start of the transmission of the preamble portion to the completion of the transmission of the frame information portion has passed (step S1101). This time period is determined considering the time (=5μ seconds) required for completing calculation with respect to packet-combining of one packet in the calculation of the frame length. If it is determined in step S1101 that the time period has not passed, the relevant processes which have been described earlier with reference to FIG. 4 are performed. If it is determined in step S1101 that the time period has passed, the process is suspended until the transmission of the remaining part of the preamble portion and frame information portion is completed (step S1102), and then transmission of the frame length portion and the remaining part of the frame is requested (step S411).

As described above, in the communication apparatus and the communication method according to an embodiment of the present invention, a process of transmitting the preamble portion and the frame information portion, which do not depend on packets, is performed concurrently with a process of calculating the length of a frame composed of a plurality of packets combined together. Thus, improvement in transmission efficiency is achieved by combining packets while the value of the interframe gap is set low. In addition, the communication apparatus on the receiving end is capable of easily determining, from information in the frame length portion, a time period required for completing reception of one frame composed of a plurality of packets combined together. Therefore, it is made possible to avoid conflict with another communication apparatus by grasping usage status of media in communication apparatuses that are currently communicating with each other.

It is to be appreciated that the above-described embodiment can also be realized by causing a CPU to execute a program which is capable of causing the CPU to execute the above-described processing procedures and stored in a storage device (e.g., a ROM, a RAM, a hard disk, etc.). In this case, the program may first be stored within the storage device via a recording medium and thereafter executed, or may be directly executed from the recording medium. The term "recording medium" used herein refers to a semiconductor memory (e.g., a ROM, a RAM, a flash memory, etc.), a magnetic disk memory (e.g., a flexible disk, a hard disk, etc.), an optical disk (e.g., a CD-ROM, a DVD, a BD, etc.), or other recording medium such as a memory card. It is to be appreciated that the "recording medium" also includes conceptually a communication medium, such as a telephone line, a carrier channel, or the like.

Each functional block indicated by a broken line in FIG. 1, i.e., the frame length calculation section 12, the communication control section 13, and the frame generation section 14, may be realized in the form of an LSI, which is an integrated circuit. Each of the functional blocks may be individually realized as one chip, or some or all of the functional blocks may be realized as one chip. Although as such an integrated circuit, only an LSI is mentioned above, the integrated circuit may be referred to as an IC, a system LSI, a super LSI, or an ultra LSI depending on the degree of integration.

The method for realizing circuit integration is not limited to use of an LSI. Circuit integration may be realized by use of a dedicated circuit or a general purpose processor. Alternatively, a Field Programmable Gate Array (FPGA), which is capable of being programmed after production of an LSI, may be used, or a reconfigurable processor, which allows the connection or setting of circuit cells inside an LSI to be reconfigured after production of the LSI, may be used.

Further, if the progress of the semiconductor technology or another derivative technology produces a new circuit integration technology which replaces LSIs, such a circuit integration technology may naturally be employed for the integration of the functional blocks. For example, such a circuit integration technology may be produced by the application of biotechnology.

Hereinafter, the above-described embodiment of the present invention will be described with respect to an exemplary case where the embodiment is applied to a high-speed power line transmission network system. In this system, a signal interface (e.g., an interface of IEEE1394, a USB interface, etc.) provided in a multimedia device (e.g., a personal computer, a DVD recorder, a digital television, a home server system, or the like) is connected to a power line via an adapter that has the functions of the present invention. Thus, a network system is configured that employs as a medium a power line which is capable of transmitting digital data such as multimedia data or the like at high speeds. This system does not require a network cable to be newly laid as in the case of a conventional wired LAN, and can be realized by employing as a network channel a power line as it is, which is already provided at a house, an office, or the like. Therefore, this system is very convenient in terms of cost and easiness of installation.

Figure 12:
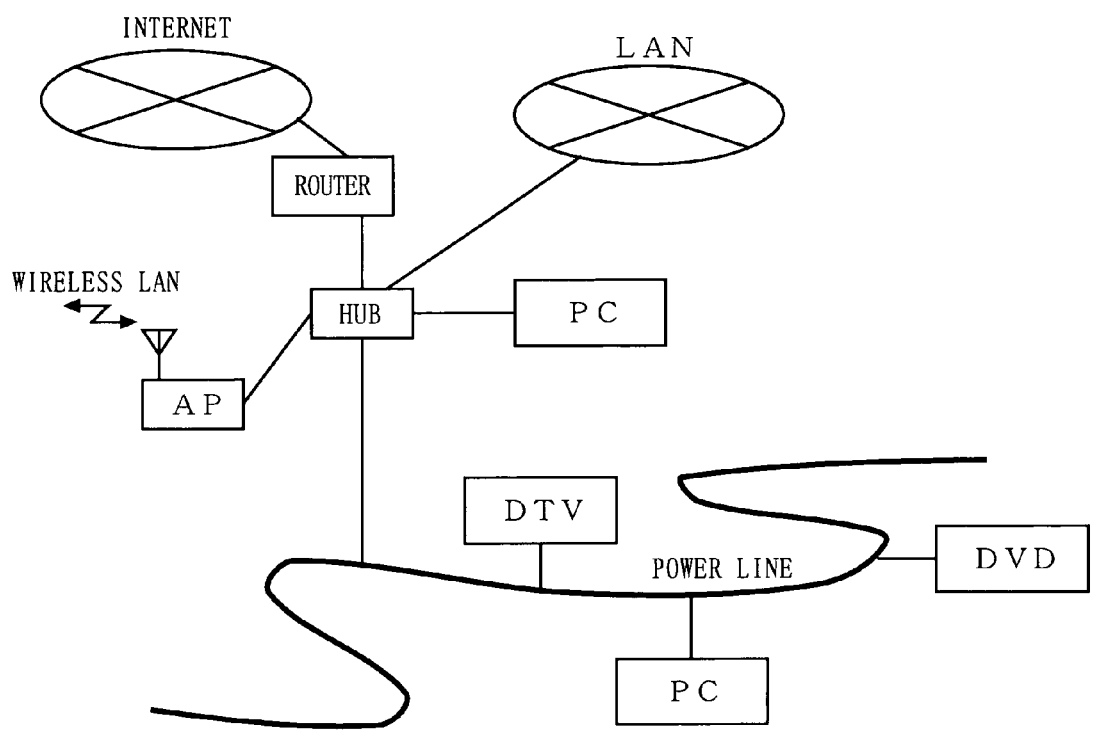
FIG. 12 is a diagram illustrating an exemplary configuration of a network system for high-speed power line communication to which the present invention is applied.
Figure 13:
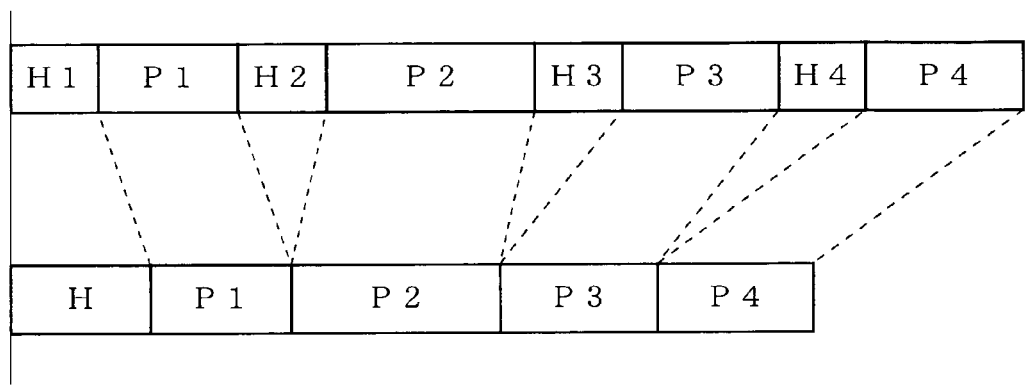
FIG. 13 is a diagram for explaining a conventional method for reducing decrease in packet transmission efficiency.

In the example above, the adaptor is used to convert a signal interface of an existing multimedia device into an interface for power line communication, whereby the existing device is applied to power line communication. However, multimedia devices will come to have the functions of the present invention in the future, so that data transmission between the multimedia devices via power codes of the devices will become possible. In this case, as illustrated in FIG. 12, because the need for an adaptor, an IEEE1394 cable, or a USB cable is eliminated, the arrangement of wires is made simpler. In addition, since the connection to the Internet via a router or the connection to a wired/wireless LAN via a hub or the like is available, the high-speed power line transmission system according to the present invention can be used to extend a LAN system. Further, since communication data is passed through a power line in a power line transmission system, the system does not produce the problem of data leakage because of interception of radio waves, which may occur in a wireless LAN. Thus, the power line transmission system is also effective in security terms, e.g., in data protection. Needless to say, data which is passed through the power line is protected by means of, e.g., IPSec in an IP protocol, encryption of contents themselves, other DRM systems, or the like.

While the invention has been described in detail, the foregoing description is in all aspects illustrative and not restrictive. It is understood that numerous other modifications and variations can be devised without departing from the scope of the invention.

What is claimed is:

1. A communication apparatus for performing communication by using a data communication frame formed from a plurality of portions, the portions being arranged in an order of a preamble portion for demodulation and synchronization, a frame information portion containing a data type of the frame, a frame length portion for indicating a length of the frame, and a data body portion composed of more than one data packet combined together, the communication apparatus comprising:
   a frame length calculation section operable to, each time a request to transmit a data packet is made from an upper layer, calculate a frame length the frame would have if combining of the data packet is performed;
   a communication control section operable to determine a number of data packets that are to be combined together in the frame based on a calculation by the frame length calculation section; and
   a frame generation section operable to generate and transmitting the preamble portion and the frame information portion concurrently with calculation by the frame length calculation section, and, after the calculation by the frame length calculation section is completed, generating and transmitting the frame length portion and the data body portion composed of the number of data packets combined together, the number having been determined by the communication control section.

2. The communication apparatus according to claim 1, wherein the frame generation section sets a length of the preamble portion so that the calculation by the frame length calculation section is completed before transmission of the preamble portion and the frame information portion is completed.

3. The communication apparatus according to claim 1, wherein the communication control section sets the number of data packets to be combined together in the frame so that the calculation by the frame length calculation section is completed before transmission of the preamble portion and the frame information portion is completed.

4. The communication apparatus according to claim 1, wherein the frame length is measured in a number of symbols or a length of time.

5. The communication apparatus according to claim 1, wherein the frame information portion and the frame length portion have been subjected to modulation having a high error tolerance or an error correcting coding.

6. A communication method for performing communication by using a data communication frame formed from a plurality of portions, the portions being arranged in an order of a preamble portion for demodulation and synchronization, a frame information portion containing a data type of the frame, a frame length portion for indicating a length of the frame, and a data body portion composed of more than one data packet combined together, the method comprising:
   each time a request to transmit a data packet is made from an upper layer, calculating a frame length the frame would have if combining of the data packet is performed;
   determining a number of data packets that are to be combined together in the frame based on a calculation by the calculating;
   generating and transmitting the preamble portion and the frame information portion concurrently with calculation by the calculating; and
   after the calculation by the calculating is completed, generating and transmitting the frame length portion and the data body portion composed of the number of data packets combined together, the number having been determined by the determining.

7. An integrated circuit for use in a communication apparatus for performing communication by using a data communication frame formed from a plurality of portions, the portions being arranged in an order of a preamble portion for demodulation and synchronization, a frame information portion containing a data type of the frame, a frame length portion for indicating a length of the frame, and a data body portion composed of more than one data packet combined together, the integrated circuit having integrated therein circuits that function respectively as:
   a frame length calculation section operable to, each time a request to transmit a data packet is made from an upper layer, calculate a frame length the frame would have if combining of the data packet is performed;
   a communication control section operable to determine a number of data packets that are to be combined together in the frame based on a calculation by the frame length calculation section; and
   a frame generation section operable to generate and transmitting the preamble portion and the frame information portion concurrently with calculation by the frame length calculation section, and, after the calculation by the frame length calculation section is completed, generating and transmitting the frame length portion and the data body portion composed of the number of data packets combined together, the number having been determined by the communication control section.

* * * * *